(12) United States Patent
Liu

(10) Patent No.: US 11,159,192 B2
(45) Date of Patent: Oct. 26, 2021

(54) AUTOMATIC SCREEN PROTECTOR ATTACHING MACHINE

(71) Applicant: SDL TECHNOLOGY CO., LTD., QinZhou (CN)

(72) Inventor: Tak Nam Liu, QinZhou (CN)

( * ) Notice: Subject to any disclaimer, the term of this patent is extended or adjusted under 35 U.S.C. 154(b) by 0 days.

(21) Appl. No.: 17/037,939

(22) Filed: Sep. 30, 2020

(65) Prior Publication Data
US 2021/0211153 A1 Jul. 8, 2021

(30) Foreign Application Priority Data

Jan. 7, 2020 (CN) .......................... 202010014200.8

(51) Int. Cl.
*H04B 1/3888* (2015.01)
*G06F 1/16* (2006.01)

(52) U.S. Cl.
CPC ......... *H04B 1/3888* (2013.01); *G06F 1/1626* (2013.01); *G06F 2200/1634* (2013.01)

(58) Field of Classification Search
CPC .................................................. H04B 1/3888
See application file for complete search history.

(56) References Cited

FOREIGN PATENT DOCUMENTS

DE 102015111088 A * 1/2017 ......... B32B 38/1833

\* cited by examiner

*Primary Examiner* — Keith Ferguson
(74) *Attorney, Agent, or Firm* — Rumit Ranjit Kanakia

(57) ABSTRACT

An automatic screen protector attaching machine, comprising a base, a first displacement device, a film grabbing device, a second displacement device, a cleaning device and an storage device; wherein the first displacement device, the film grabbing device, the second displacement device, the cleaning device and the storage device are all fixed on the base, the storage device extends into the base and is located in the middle thereof, the first displacement device comprises an X-axis moving device and a Y-axis moving device, the film grabbing device is fixedly arranged on a fixation part of the Y-axis moving device.

12 Claims, 4 Drawing Sheets

AUTOMATIC SCREEN PROTECTOR ATTACHING MACHINE

TECHNICAL FIELD

The present application claims priority to China Patent Application No. 202010014200.8, filed on Jan. 7, 2020, the entire content of which is incorporated herein by reference.

TECHNICAL FIELD

The present application relates to the field of machinery and mobile phone accessories, and in particular to an automatic screen protector attaching machine.

BACKGROUND

The screen protector of the mobile phone, also known as the mobile phone cosmetic film and the mobile phone protective film, is a cold mounting film configured to be mounted on the surface of a mobile phone body, a screen and other tangible objects. There are many kinds of screen protector. The screen protector is not limited to being mounted on the mobile phone, but also configured to be mounted on a MP3, a MP4, a computer screen, a mouse, a sound box and any physical objects that need to be protected. The screen protector is originally widely used in the cosmetics of the mobile phone, so the name of mobile phone film is obtained. Since the mobile phone with the mobile phone film is completely new, bright and dazzling, not only can play a effect of old mobile phone retrofitted, but also can prevent the dust from entering the keyboard and the screen, playing a protective role, thus the mobile phone film is also referred to as a mobile phone cosmetic film and a mobile phone protective film.

The existing mobile phone film is installed manually, which has a high cost.

SUMMARY

Embodiments of the present application provide an automatic screen protector attaching machine, which can realize automatic attaching of the screen protector of the mobile phone, and has the advantage of reducing cost.

One embodiment of the present application provides an automatic screen protector attaching machine, which comprises a base, the first displacement device, a film grabbing device, the second displacement device, a cleaning device and an storage device;

wherein the first displacement device, the film grabbing device, the second displacement device, the cleaning device and the storage device are all fixed on the base, the storage device extends into the base and is located in the middle thereof, the first displacement device comprises an X-axis moving device and a Y-axis moving device, the film grabbing device is fixedly arranged on a fixation part of the Y-axis moving device;

the second displacement device comprises a motor and a sliding belt, wherein the motor drives the sliding belt to move, the cleaning device is arranged at a starting end of the second displacement device.

Preferably, the automatic screen protector attaching machine comprises a plurality of storage devices arranged in an array.

Preferably, the cleaning device comprises an ultrasonic cleaning component and an air blowing component.

Preferably, the film grabbing device comprises a rotating part and a film grabbing head, wherein the rotating part is configured to control the angle of the film grabbing head, and control the screen protector of the mobile phone to rotate a certain angle when the film grabbing head is close to the mobile phone.

The embodiments of the present application have the following beneficial effects: the user places a mobile phone at the starting end of the second displacement device, at this time, the cleaning device cleans the surface of the mobile phone, after cleaning, the motor drives the sliding belt to drive the mobile phone to move to a corresponding position; meanwhile, the first displacement device drives the film grabbing device to grab a screen protector corresponding to the mobile phone, then moves the screen protector to the position of the mobile phone, and attaches the screen protector to the mobile phone, so as to realize automatic screen protector attaching. Since the machine does not require manual operation, the cost is reduced.

BRIEF DESCRIPTION OF THE DRAWINGS

In order to illustrate the technical solutions in the embodiments of the present application more clearly, drawings used in the description of the embodiments will be briefly described below, obviously, the drawings in the following description are some embodiments of the present application, those of ordinary skill in the art can also obtain other drawings based on these drawings without any creative efforts.

DESCRIPTION OF THE EMBODIMENTS

The technical solutions in the embodiments of the present application will be described clearly and completely with reference to the accompanying drawings in the embodiments of the present application, obviously, the described embodiments are a part of the embodiments of the present application, rather than all of the embodiments. Based on the embodiments of the present application, all other embodiments obtained by a person of ordinary skill in the art without creative efforts all belong to the scope of protection of the present application.

The terms, such as "first", "second", "third", "fourth", etc., in the specification, claims and the accompanying drawings of the present application are used to distinguish different objects, and are not intended to describe a specific order. Furthermore, the terms "comprise", "have" and any variations thereof are intended to cover a non-exclusive inclusion. For example, a process, method, system, product, or device that comprises a series of steps or units is not limited to the listed steps or units, but alternatively comprises steps or units that are not listed, or alternatively comprises other steps or units inherent to these processes, methods, products or devices.

References to "an embodiment" herein mean that a particular feature, structure, or characteristic described in connection with the embodiments may be included in at least one embodiment of the present application. The appearances of the phrase in various places in the specification are not necessarily referring to the same embodiments, and are not exclusive or alternative embodiments that are mutually exclusive from other embodiments. Those skilled in the art will explicitly and implicitly understand that the embodiments described herein can be combined with other embodiments.

Figure 1:
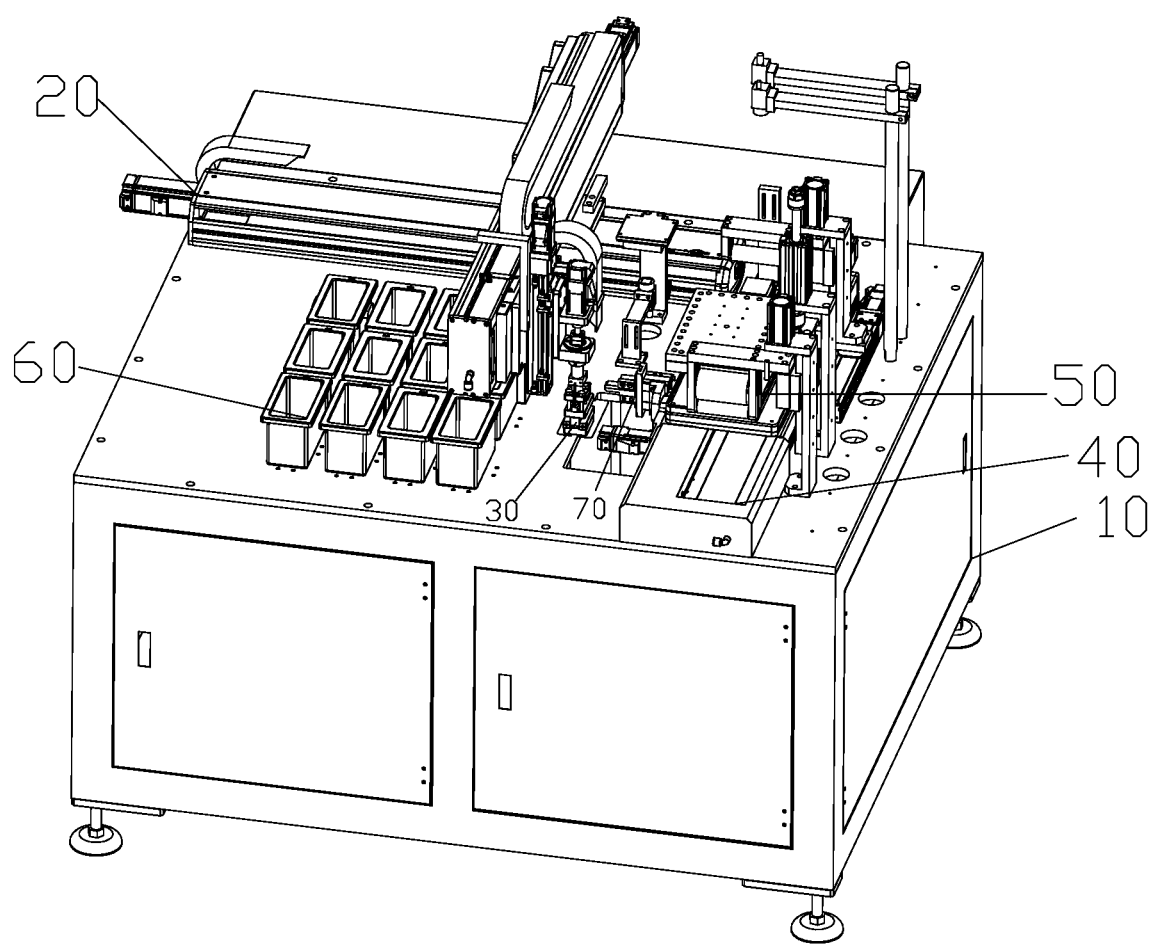
FIG. 1 is a perspective view of an automatic screen protector attaching machine provided by an embodiment of the present application.
Figure 2:
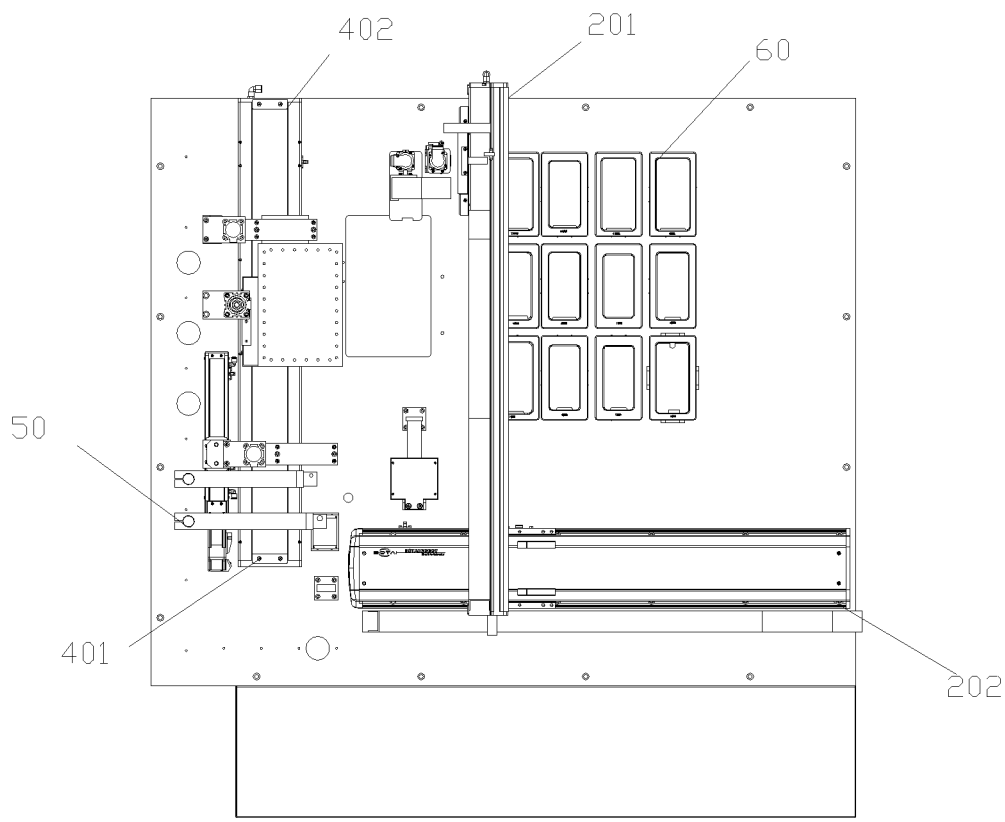
FIG. 2 is a top view of an automatic screen protector attaching machine provided by an embodiment of the present application.
Figure 3:
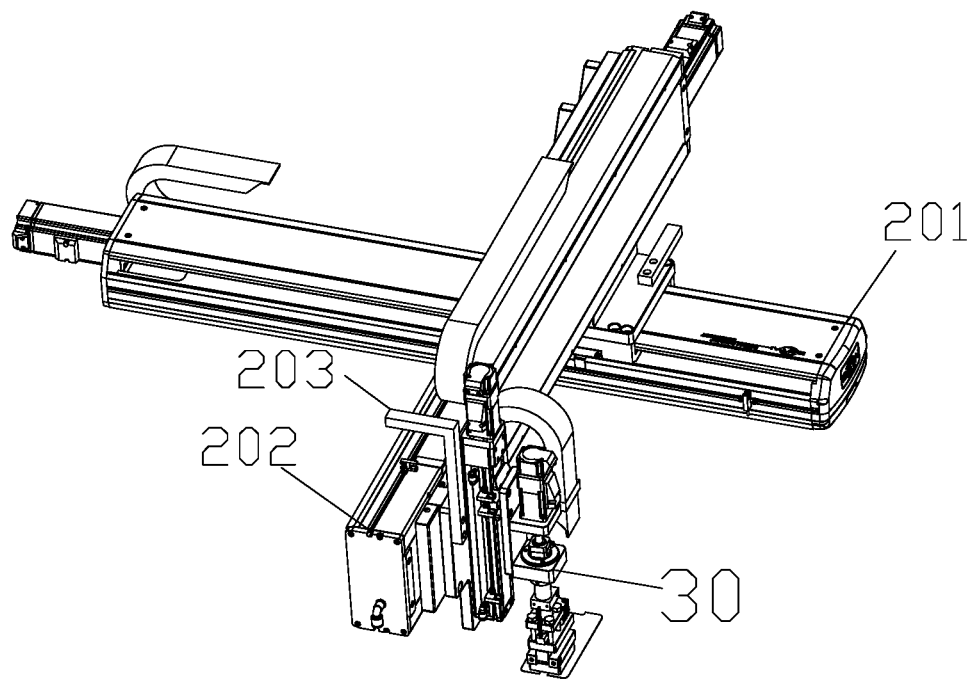
FIG. 3 is a perspective view of the first displacement device provided by an embodiment of the present application.

Referring to FIG. 1, FIG. 1 is a perspective view of an automatic screen protector attaching machine, as shown in FIG. 1, the automatic screen protector attaching machine comprises a base 10, the first displacement device 20, a film grabbing device 30, the second displacement device 40, a cleaning device 50, an storage device 60 and a film stripping device 70, wherein the first displacement device 20, the film grabbing device 30, the second displacement device 40, the cleaning device 50 and the storage device 60 are all fixed on the base 10. As shown in FIG. 2, the storage device 60 extends into the base 10 and is located in the middle of the base, the first displacement device 20 (as shown in FIG. 3) comprises an X-axis moving device 201 and a Y-axis moving device 202, the film grabbing device 30 is fixedly arranged on a fixation part of the Y-axis moving device 202, the second displacement device 40 comprises a motor 401 and a sliding belt 402, wherein the motor 401 drives the sliding belt 402 to move, the cleaning device 50 is arranged at a starting end of the second displacement device 40.

The working principle of the automatic screen protector attaching machine is as follows: the user places a mobile phone at the starting end of the second displacement device 40, at this time, the cleaning device 50 cleans the surface of the mobile phone, after cleaning, the motor 401 drives the sliding belt 402 to drive the mobile phone to move to a corresponding position; meanwhile, the first displacement device drives the film grabbing device to grab a screen protector corresponding to the mobile phone, then moves the screen protector to the position of the mobile phone, and attaches the screen protector to the mobile phone, so as to realize automatic screen protector attaching. Since the machine does not require manual operation, the cost is reduced.

In particular, as shown in FIG. 2, there are a plurality of storage devices 60, and the plurality of storage devices are arranged in an array. Arranging the plurality of storage devices may realize screen protector attaching for varied models of mobile phones.

In particular, the automatic screen protector attaching machine may further comprise a film stripping device 70 fixed on one side of the second displacement device 40 for performing film stripping operation on the screen protector of the mobile phone.

The film stripping device 70 may perform film stripping operation on the protective film layer of the screen protector of the mobile phone.

Alternatively, the cleaning device 50 may comprise an ultrasonic cleaning component and an air blowing component.

Figure 4:
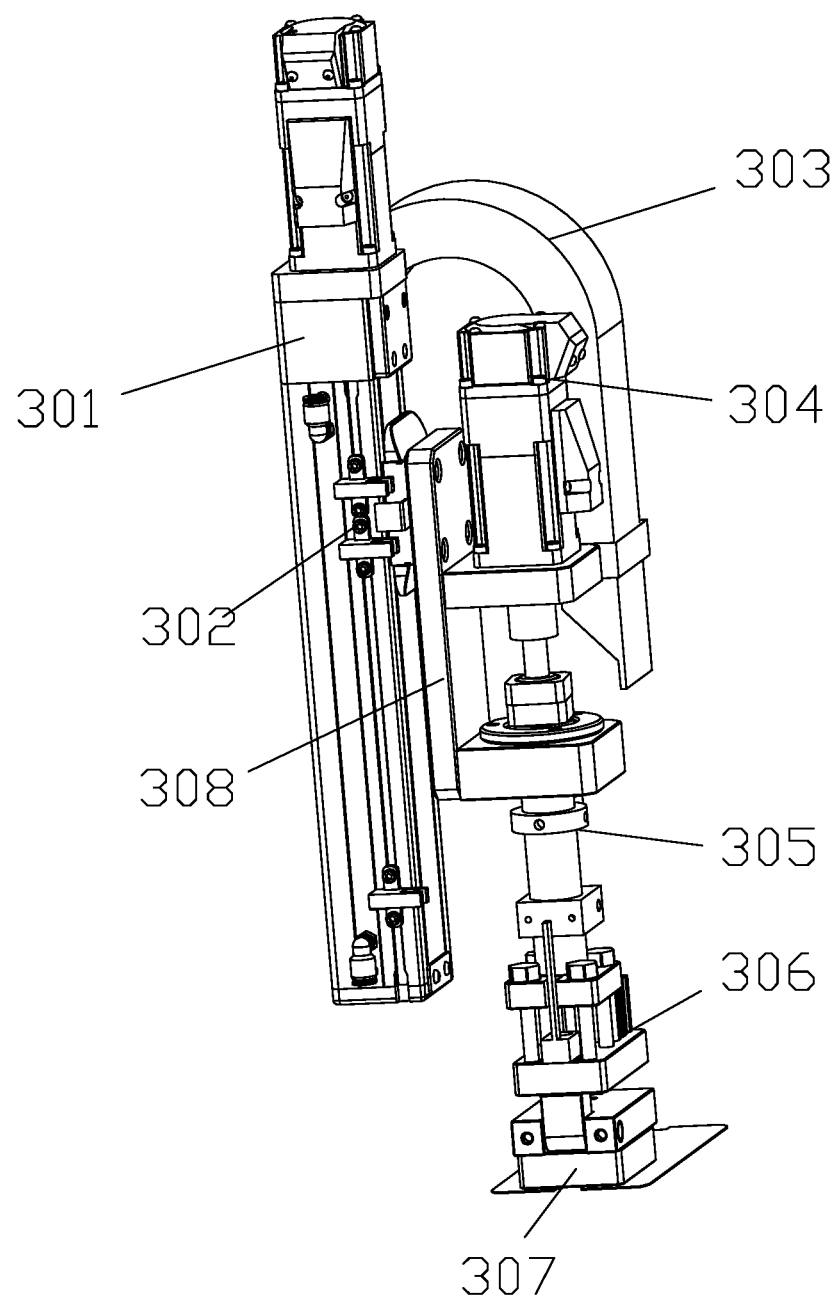
FIG. 4 is a front view of a film grabbing device provided by an embodiment of the present application.

In particular, the film grabbing device 30 is fixed to the fixing plate 203, the fixing plate 203 is fixed to the Y-axis moving device 202. Referring to FIG. 4, the film grabbing device 30 may comprise a column 301, a sliding groove 302, a track 303, a telescopic cylinder 304, a telescopic column 305, a rotating part 306 and a film grabbing head 307, wherein the rotating part 306 is configured to control the angle of the film grabbing head 307, the column 301 is fixedly connected to the fixing plate 203, the sliding groove 302 is disposed outside the column 301, one end of a moving plate 308 moves up and down along the sliding groove 302, the other end of the moving plate is connected to a moving end of the track 303, the telescopic cylinder 304 is fixed to the moving plate 308, the telescopic cylinder 304 controls the expansion and contraction of the telescopic column 305, the film grabbing head 307 is connected to a telescopic end of the telescopic column, the rotating part 306 controls the angle of a film attaching plate 3074 of the film grabbing head 307.

When the film attaching plate is close to the mobile phone, control the screen protector of the mobile phone to rotate a certain angle, so as to enable the screen protector to be partially attached to the mobile phone firstly, which simulates the process of manually installing the screen protector, thereby reducing the air bubbles of the screen protector of the mobile phone.

Figure 5:
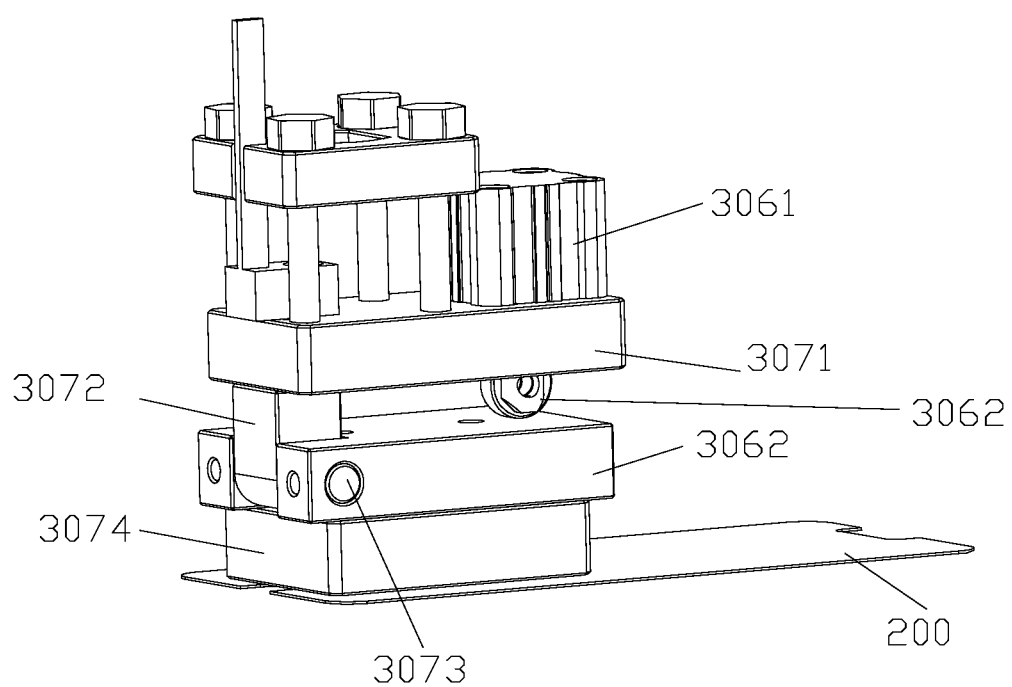
FIG. 5 is a front view of a film grabbing head and a rotating part provided by an embodiment of the present application.

Referring to FIG. 5, FIG. 5 is a structural schematic diagram of a grabbing head and a rotating part provided by the present application. As shown in FIG. 5, the rotating part 306 comprises a rotating motor 3061 and a rotating bearing 3062. The film grabbing head 307 comprises the first fixing plate 3071, a U-shaped hook 3072, a circular shaft 3073, a film attaching plate 3074 and a rotating plate 3062, wherein the first fixing plate 3071 is fixed to the telescopic end of the telescopic column 305, the rotating motor 3061 is fixed to an upper end of the first fixing plate, a rotating shaft of the rotating motor 3061 is connected to the rotating bearing 3062 through the first fixing plate 3071, the outer surface of the rotating bearing 3062 is in contact with the upper surface of the rotating plate 3062, a part of the outer surface of the rotating bearing 3062 has a protrusion, one side of the U-shaped hook 3072 is connected with the lower surface of the first fixing plate, the dimensions of the hook side of the U-shaped hook 3072 and the circular shaft 3073 are configured in such a way that the circular shaft 3073 can move with the rotation of the U-shaped hook 3072, the corresponding side of the rotating plate 3062 is provided with a circular hole matched with the circular shaft 3073, the upper surface of the film attaching plate 3074 is fixed to the rotating plate 3062, the lower surface of the film attaching plate 3074 is attached to the screen protector of the mobile phone 200.

The principle of the above rotation is as follows: after the screen protector of the mobile phone 200 is attached to the film attaching plate 3074, the rotating motor may control the rotating bearing to rotate, in this case, because a part of the outer surface of the rotating bearing 3062 has the protrusion, which will contact the rotating plate and push the rotating plate downward for a slight angle, in such a way that the front end of the screen protector of the mobile phone may contact the mobile phone screen first, and then the telescopic column moves downward, in such a way that the whole screen protector of the mobile phone is attached to the mobile phone screen, in this way, manual installing of the screen protector is simulated, and the generation of air bubbles is avoided.

The embodiments of the present application are described in detail above, specific examples are used herein to set forth the principles and implementations of the present application, and the description of the above embodiments is merely used for aiding to understand the method of the present application and the core idea thereof. Meanwhile, for a person of ordinary skill in the art, according to the concept of the present application, there will be a change in the specific implementation and application range, and in summary, the contents of the present description should not be construed as limiting the present application.

What is claimed is:

1. An automatic screen protector attaching machine, comprising a base, a first displacement device, a film grabbing device, a second displacement device, a cleaning device and an storage device;
wherein the first displacement device, the film grabbing device, the second displacement device, the cleaning device and the storage device are all fixed on the base, the storage device extends into the base and is located in the middle thereof, the first displacement device comprises an X-axis moving device and a Y-axis moving device, the film grabbing device is fixed onto a fixation part of the Y-axis moving device.

2. The automatic screen protector attaching machine of claim 1, wherein the second displacement device comprises a motor and a sliding belt, the motor drives the sliding belt to move, and the cleaning device is arranged at a starting end of the second displacement device.

3. The automatic screen protector attaching machine of claim 2, wherein the automatic screen protector attaching machine comprises a plurality of storage devices arranged in an array.

4. The automatic screen protector attaching machine of claim 2, wherein the cleaning device comprises an ultrasonic cleaning component and an air blowing component.

5. The automatic screen protector attaching machine of claim 2, wherein the film grabbing device is fixed onto the fixing plate, and the fixing plate is fixed to the Y-axis moving device.

6. The automatic screen protector attaching machine of claim 5, wherein the film grabbing device comprises a column, a sliding groove, a track, a telescopic cylinder, a telescopic column, a rotating part and a film grabbing head, and the rotating part is configured to control the angle of the film grabbing head.

7. The automatic screen protector attaching machine of claim 6, wherein the column is fixed onto the fixing plate, the sliding groove is disposed outside the column, one end of a moving plate moves up and down along the sliding groove, the other end of the moving plate is connected to a moving end of the track, the telescopic cylinder is fixed onto the moving plate, the telescopic cylinder controls the expansion and contraction of the telescopic column, the film grabbing head is connected to a telescopic end of the telescopic column, and the rotating part controls the angle of a film attaching plate of the film grabbing head.

8. The automatic screen protector attaching machine of claim 7, wherein the rotating part comprises a rotating motor and a rotating bearing.

9. The automatic screen protector attaching machine of claim 8, wherein the film grabbing head comprises a first fixing plate, a U-shaped hook, a circular shaft, a film attaching plate and a rotating plate, the first fixing plate is fixed onto the telescopic end of the telescopic column, the rotating motor is fixed to an upper end of the first fixing plate, and a rotating shaft of the rotating motor is connected to the rotating bearing through the first fixing plate.

10. The automatic screen protector attaching machine of claim 9, wherein the outer surface of the rotating bearing is in contact with the upper surface of the rotating plate, and a part of the outer surface of the rotating bearing has a protrusion.

11. The automatic screen protector attaching machine of claim 10, wherein one side of the U-shaped hook is connected with the lower surface of the first fixing plate, the dimensions of the hook side of the U-shaped hook and the circular shaft are configured in such a way that the circular shaft is capable of moving with the rotation of the U-shaped hook, a corresponding side of the rotating plate is provided with a circular hole matched with the circular shaft.

12. The automatic screen protector attaching machine of claim 11, wherein the upper surface of the film attaching plate is fixed to the rotating plate, and the lower surface of the film attaching plate is attached to the screen protector of the mobile phone.

* * * * *